(12) United States Patent
Schuck

(10) Patent No.: US 6,918,206 B2
(45) Date of Patent: Jul. 19, 2005

(54) FLOATING ISLAND PLANTING SYSTEM

(76) Inventor: Richard J. Schuck, 3427 N. Furnace Rd., Jarretsville, MD (US) 21064

( * ) Notice: Subject to any disclaimer, the term of this patent is extended or adjusted under 35 U.S.C. 154(b) by 0 days.

(21) Appl. No.: 10/612,157

(22) Filed: Jul. 2, 2003

(65) Prior Publication Data

US 2004/0020116 A1 Feb. 5, 2004

Related U.S. Application Data

(60) Provisional application No. 60/393,467, filed on Jul. 2, 2002.

(51) Int. Cl.[7] ............................................. A01G 9/02
(52) U.S. Cl. .............................................................. 47/65.5
(58) Field of Search ............................. 47/65.5, 65.7, 47/595; 119/223, 239, 253, 173

(56) References Cited

U.S. PATENT DOCUMENTS

| | | | | |
|---|---|---|---|---|
| 2,531,562 A | * | 11/1950 | Eve | 47/80 |
| 4,219,349 A | * | 8/1980 | Bardsley | 71/62 |
| 5,772,484 A | * | 6/1998 | Sikorski | 441/81 |
| 5,836,108 A | | 11/1998 | Scheuer | |
| 6,014,838 A | * | 1/2000 | Asher | 47/65 |
| 6,810,831 B1 | * | 11/2004 | Opfel | 119/171 |
| 2004/0020116 A1 | * | 2/2004 | Schuck | 47/65.5 |

FOREIGN PATENT DOCUMENTS

FR     1566219     *    5/1969

* cited by examiner

*Primary Examiner*—Jeffrey L. Gellner
(74) *Attorney, Agent, or Firm*—Law Offices of Royal W. Craig

(57) ABSTRACT

An improved floating island planting system comprising a float ring formed as a circular walled member of closed-cell polyethylene foam, and a garden planter formed in a bowl configuration with a collar of greater diameter than the float ring. The bowl of the garden planter is dimensioned for nesting in the float ring, the planter is defined by a plurality of holes through the closed bottom. A fill mix comprising a combination of clay and potting soil resides in the planter. An alternate embodiment is shown in which the planting system is integrally formed from an open-ended circular collar section that is heat sealed to a conforming circular base section.

8 Claims, 6 Drawing Sheets

FLOATING ISLAND PLANTING SYSTEM

CROSS-REFERENCE TO RELATED APPLICATIONS

The present application derives priority from U.S. provisional application No. 60/393,467 for "FLOATING ISLAND PLANTING SYSTEM"; Filed: Jul. 2, 2002.

BACKGROUND OF THE INVENTION

1. Field of the Invention

The present invention relates to aquatic gardening and, more particularly, to a self-watering floating planting system for growing a wide variety of plants, aquatic and other, in ponds and container water gardens.

2. Description of the Background

Water gardeners often try to achieve a decorative effect by placing pots and planters around ponds and water gardens. Submerged planters have long been available for this purpose. A typical submerged planter support an amount of dirt for growing plants, and they are placed on submerged shelves surrounding the periphery of the pond or water garden. Unfortunately, existing submerged planters are plagued by a number of problems relating to their placement and maintenance. For example, Koi carp fish forage around in the pots and dislodge the plants and spill the contents of the pots into the pond itself. In addition, pond builders do not always build the correct depth or sized planting shelves in the pond at the outset. Consequently, ad hoc shelves are later added and these can be unstable and unsightly. Furthermore, string or filamentous algae invade the planted pots, coating the stems and leaves of the plant causing plant damage and an unsightly appearance. Water gardeners are most often meticulous with the task of maintaining a neat clean appearance of their garden. Algae (either filamentous or unicellular) spoils the appearance of the garden with string algae or green water.

There has been at least one past effort at building a floating planter. For example, U.S. Pat. No. 5,836,108 to Scheuer shows a floating planter box comprising a polyhedral planar base member of a synthetic foam resin less dense than water. The planter displaces sufficient water to float the unit with the contained volume formed by the top surface and side members filled with soil and plants. An optional anchoring means hold the planter in place on a water surface. However, this floating planter box is designed for terrestrial or non-aquatic plants. It permits just enough water seepage to grow terrestrial or non-aquatic plants. Rather than protecting aquatic or pond plants from foraging Koi, it protects terrestrial plants from foraging rodents.

Although the above-referenced patent is generally directed to a floating planter, it is designed to grow terrestrial or non-pond plants only, and it does not address the use of a specialized fill mix residing in said planter to help achieve a proper float as well as to prevent algae blooms, feed the plants and condition the surrounding water. It would be greatly advantageous to provide a floating planter system inclusive of an economical planter and specialized fill mix that combine to provide a self-watering, self-feeding, anti-algae environment that will foster the growth of a wide range of aquatic and non-aquatic plants.

SUMMARY OF THE INVENTION

It is, therefore, an object of the present invention to provide a floating planter system inclusive of an economical planter and specialized fill mix that combine to provide a self-watering, self-feeding, anti-algae environment that will foster the growth of a wide range of aquatic and non-aquatic plants.

It is another object to provide a floating planter system as described above that is highly stable when floating in water and resists tipping by wind or feeding fish.

It is still another object to provide a floating planter system as described above that incorporates a specialized fill mix in a floating planter to help achieve proper float as well as to prevent algae blooms, feed the plants and condition the surrounding water.

According to the present invention, the above-described and other objects are accomplished by providing an improved floating island planting system comprised of a polyethylene nursery planter nested in a floatation ring of closed-cell polyethylene foam. The planter is defined by a plurality of holes through the bottom to provide for the inflow of water. In addition, the planter is partially filled with particular fill mix comprising a combination of clay and potting soil. The clay is a calcined montmorillonite clay substrate which retains water and nutrients.

An alternate embodiment is shown in which the planting system is integrally formed from an open-ended circular collar section that is heat sealed to a conforming circular base section.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a floating planting system 2 for growing a wide variety of plants, aquatic and other, pots and planters in ponds and water gardens.

Figure 1:
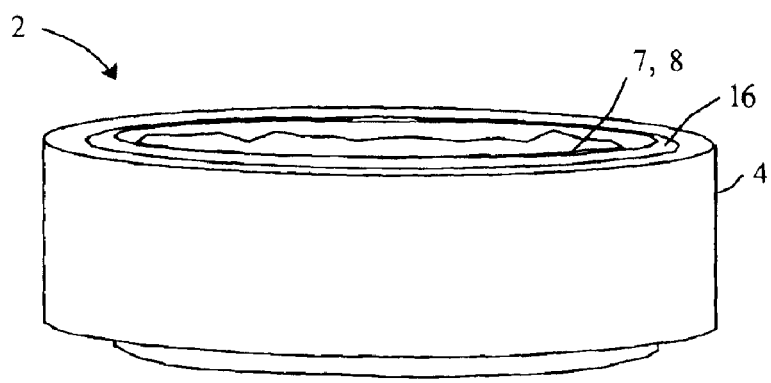
FIG. 1 is a perspective side view of a floating island planting system 2 according to a preferred embodiment of the present invention.

FIG. 1 is a perspective side view of a floating island planting system 2 according to a preferred embodiment of the present invention, inclusive of float ring 4, nested planter 16 and fill mix 7, 8. The float ring 4 with nested planter 16 are specifically designed to maintain a stable float in order to withstand foraging Koi carp and to maintain a constant depth in the water. This ensures ideal growing conditions for a wide range of aquatic and non-aquatic plants, eliminating the need for plant shelves. Planter 16 also isolates the contents from the damaging and unsightly string algae that often bothers planted pots submerged in water.

The float ring 4 is formed from closed-cell polyethylene foam that is heat sealed end-to-end to provide an inner diameter d. The bowl of planter 16 is sized to nest inside the inner diameter d of ring 4, and is slidably inserted into float ring 4 until the collar of planter 16 abuts the float ring 4 (as shown), and planter 16 is then partially filled to a predetermined depth (as will be described) with a fill 20 mix 7, 8. The fill mix may be topped with other decorative materials such as gravel or wood pellets for aesthetic purposes. The fill mix preferably comprises a blend of calcined montmorillonite clay substrate and potting soil as will be described. However, one skilled in the art should understand that a similar effect may be achieved with other mixes such as regular garden dirt and other substrates.

The combination of float ring 4, nested planter 16 and fill mix 7, 8 achieves a self-watering system wherein the planting system 2 remains floating in the water and keeps the plants moist.

Figure 2:
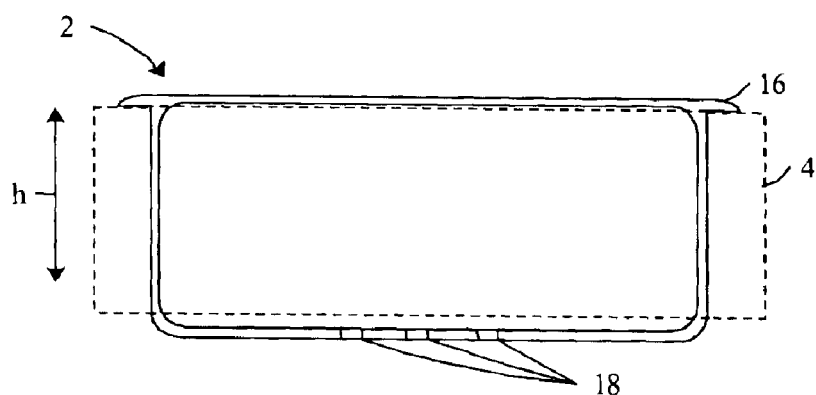
FIG. 2 is a side cross-section view of the float ring 4 and nested planter 16 as in FIG. 1.
Figure 3:
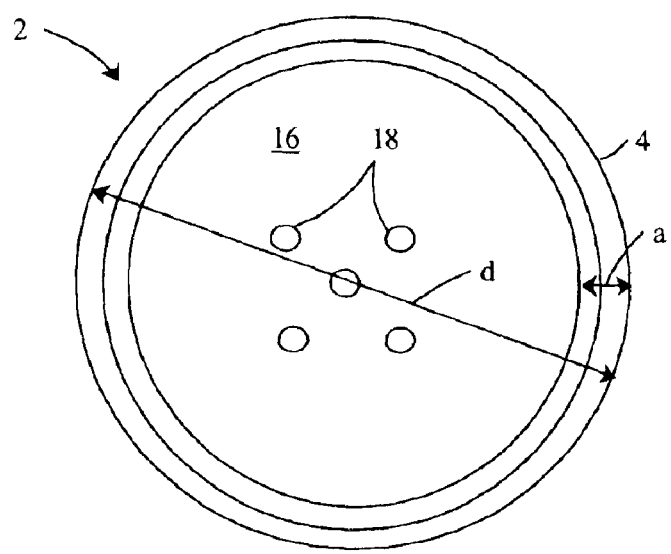
FIG. 3 is a top view of the float ring 4 and nested planter 16 as in FIGS. 1 & 2.

FIG. 2 is a side cross-section view, and FIG. 3 is a top view, respectively, of the float ring 4 and nested planter 16 as in FIG. 1. Float ring 4 is preferably constructed as a circular walled structure of closed-cell polyethylene foam that is both UV and water-resistant. The density of the foam is chosen to achieve proper buoyancy, and a 1.7 lb/cubic foot density is suitable. Such foam is readily available from Dow Chemical® and other manufacturers. The planter 16 is a polyethylene (or other plastic or PVC) bowl insert dimensioned to fit inside float ring 4 and with an upward annular collar to limit insertion therein. The planter 16 is substantially closed at the bottom but includes a plurality number of ¼" to ⅜" diameter holes 18 that provide for the inflow of water and the self-watering effect. Both planter 16 and polyethylene foam float ring 4 are preferably black to resist ultra-violet (UV) damage from sunlight. Given the foregoing construction, if string algae is present in the pond, the contents of the planting system 2 are completely isolated from its invasion. This way, the floating planting system 2 has a much greater tendency to keep a neat, clean appearance free of both forms of algae.

With combined reference to FIGS. 2 and 3, it is important to note that the bowl of planter 16 protrudes down beneath the float ring 4 slightly. This suspends the load slightly below the ring of lateral buoyancy and ensures lateral stability so that the planter 16 will maintain a stable float. Given this constraint, the planter 4 may otherwise be provided in a range of incremental dimensions to appease the varying needs of the gardener while maintaining a good ballast.

The following table lists a range of presently preferred dimensions (with reference to FIGS. 2 and 3).

| Planter 16 and Ring 4 Dimensions (in inches) | | |
| --- | --- | --- |
| d | a | h |
| 5 | 1 | 1–2 |
| 9 | 2 | 1–2 |
| 12 | 1.5 | 4 |
| 16 | 2 | 4 |
| 20 | 2 | 6 |
| 24 | 2 | 6 |
| 26 | 4 | 6 |

Figure 4:
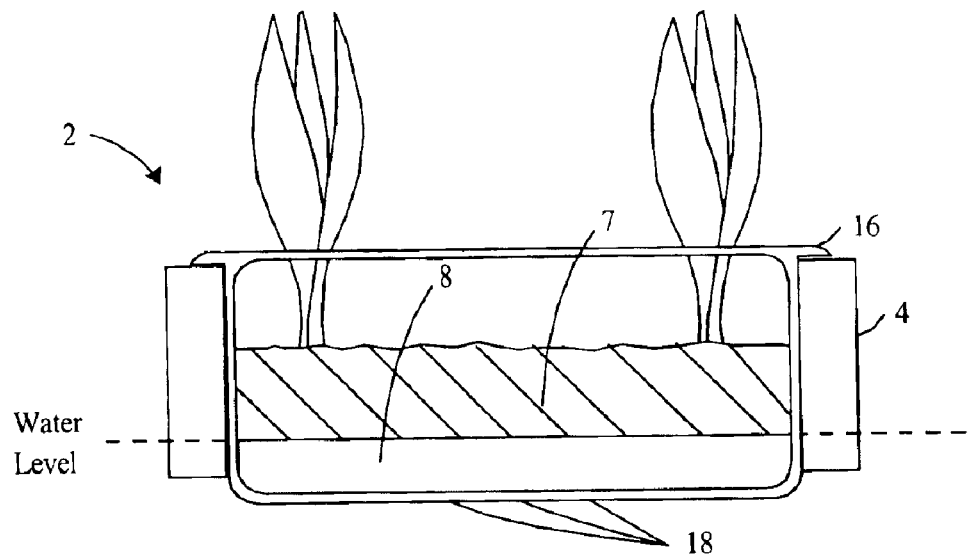
FIG. 4 is a side cross-section view of the floating island planting system 2 as in FIGS. 1–3 illustrating a shallow float configuration.

FIG. 4 is a side cross-section view of the floating island planting system 2 as in FIGS. 1–3 illustrating a shallow float configuration. As stated above, the fill mix comprises a blend of calcined montmorillonite clay substrate 8 and potting soil 7. The exact mix of clay 8 and potting soil 7 as well as the overall amount is varied in accordance with the amount of float desired and the moisture requirements of the plants being planted by the gardener. Specifically, a mix of approximately 3 parts potting soil 7 to one part clay 8 layered as shown will achieve the shallow float depth shown in FIG. 4. The clay 8 absorbs water and nutrients and is denser than the potting soil, and hence a shallow float requires less clay and more potting soil than a deep float. The depth of float will in turn affect the amount of moisture retained in the system 2. Consequently, a deep float will be wetter than a shallow float. Terrestrial plants will prefer the shallow float, whereas pond plants will prefer the deep or wetter float. The calcined clay 8 is preferred for its many desirable properties, most importantly its ability to retain moisture for ballast, and its tendency to absorb nutrients from the surrounding water, thereby providing a source of food for the plants. More specifically, the calcined clay substrate has a high cation exchange capacity that attracts and absorbs ions of ammonium, potassium, calcium and magnesium in a non-leachable form which is readily used by any plants rooted in the substrate. These nutrients are vital to good plant growth and vigor. In addition, the ability of the clay substrate to attract and hold on to nutrients is good for the quality of the surrounding water as it lowers the nutrient levels in the water, thereby making it less prone to algae blooms. Ammonium is toxic to fish, and this is removed by the clay and plants growing therein leaving the water healthier for fish. However, one skilled in the art should understand that a similar effect may be achieved with other mixes such as regular garden dirt and other substrates.

Figure 5:
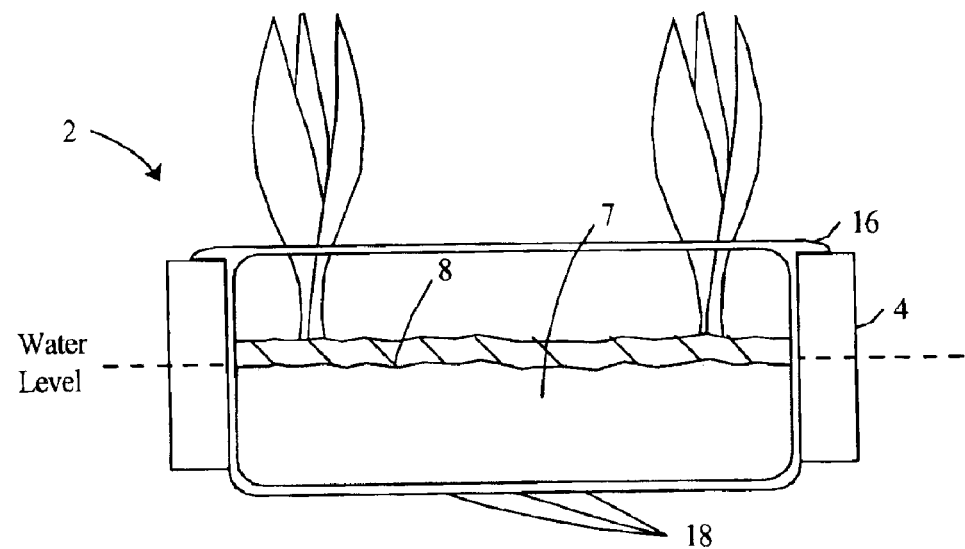
FIG. 5 is a side cross-section view of the floating island planting system 2 as in FIGS. 1–3 illustrating a deep float configuration.

FIG. 5 is a side cross-section view of the floating island planting system 2 as in FIGS. 1–3 illustrating a deep float configuration. Specifically, a mix of approximately 1 parts potting soil 7 to three parts clay 8 layered as shown will achieve the shallow float depth shown in FIG. 4.

Figure 6:
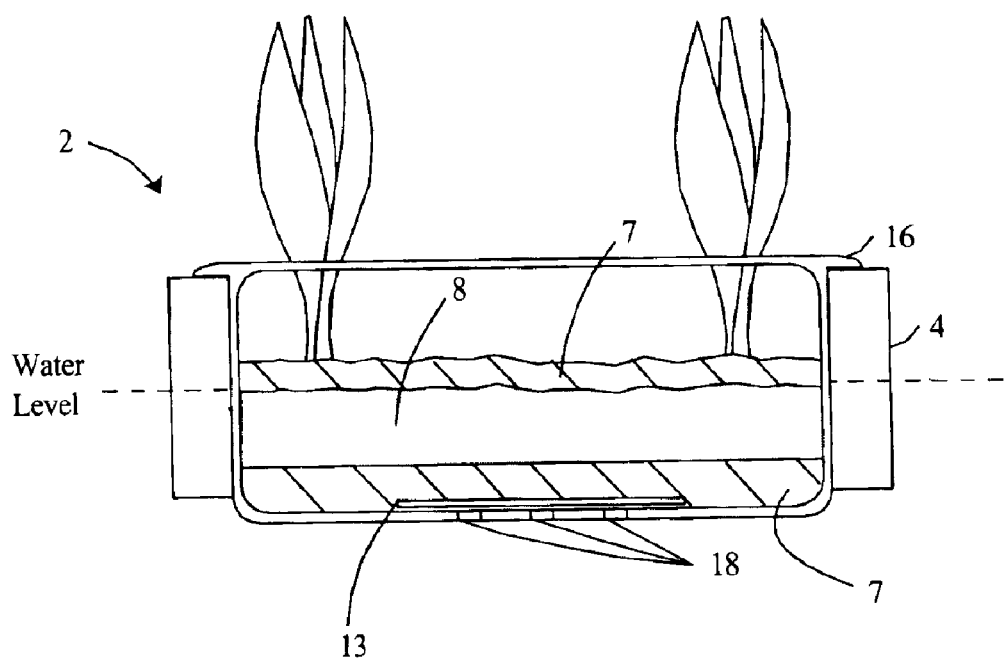
FIG. 6 is a side cross-section of the floating island planting system 2 as in FIGS. 1–5 illustrating a three layer mix.

FIG. 6 is a side cross-section of the floating island planting system 2 as in FIGS. 1–5 illustrating a three layer mix, with an additional layer of potting soil 7 at the bottom. The layer of potting soil 7 at the bottom prevents the granular clay 8 from leaking out into the water. If desired, a sheet 13 of netting or wire mesh can be incorporated over holes 18 to further prevent leaking.

Figure 7:
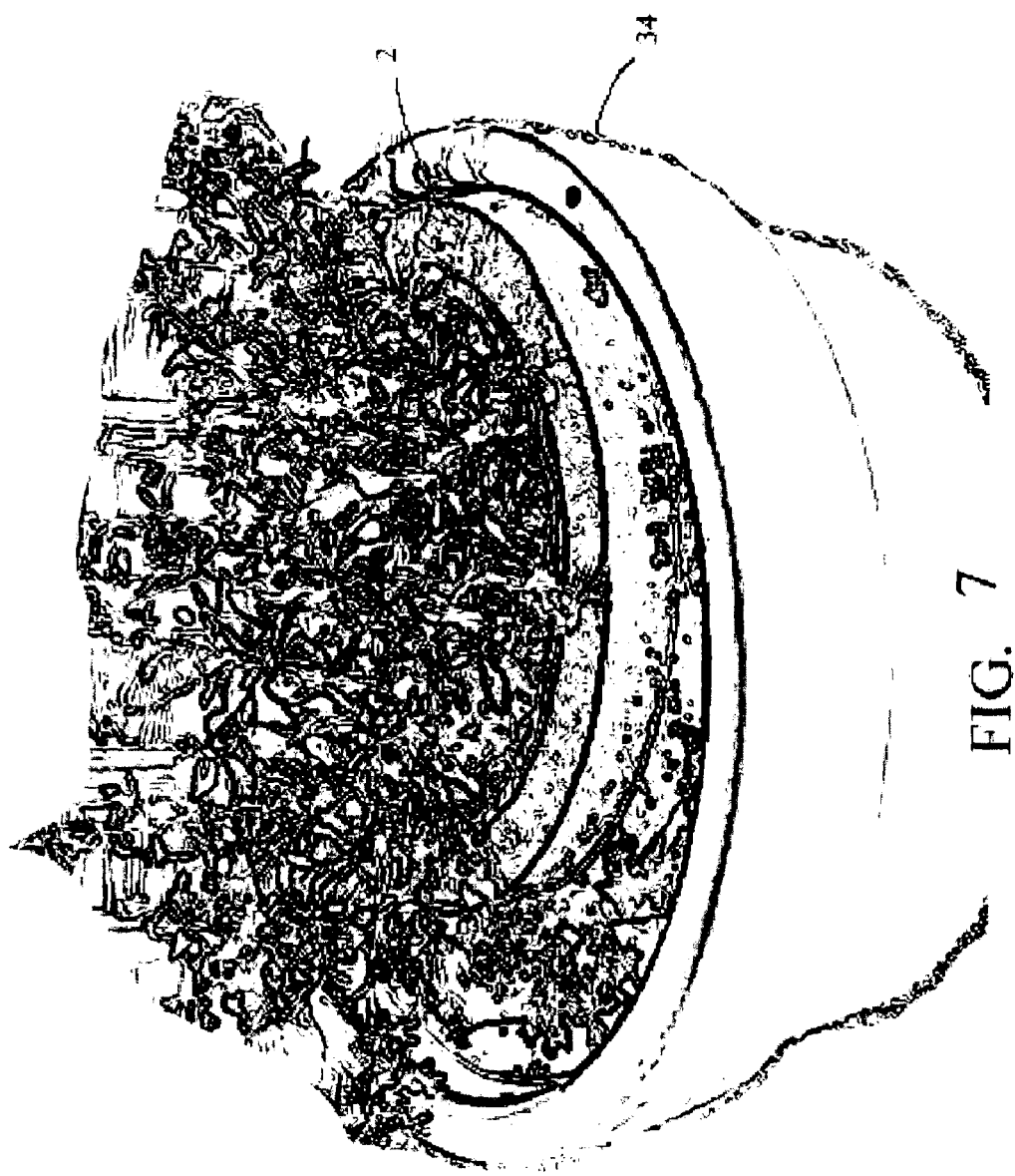
FIG. 7 is a side perspective photo of the floating island planting system 2 as in FIGS. 1–3 in use as a self-watering planter.

FIG. 7 is a side perspective photo of the floating island planting system 2 as in FIGS. 1–3 in use as a self-watering planter. This is accomplished simply by floating the above-described planting system 2 in a larger water-filled pot 34. It is desirable, for instance, when a person is planning an extended vacation and wishes to keep their plants alive in the meantime. No maintenance is needed.

Figure 8:
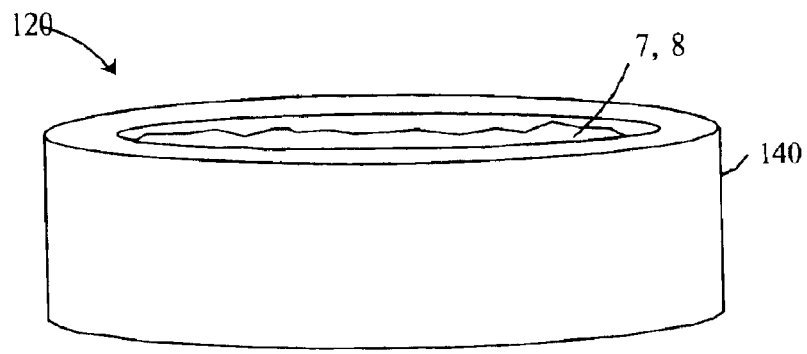
FIG. 8 is a side perspective photo of an alternative embodiment of a planning system 120.
Figure 9:
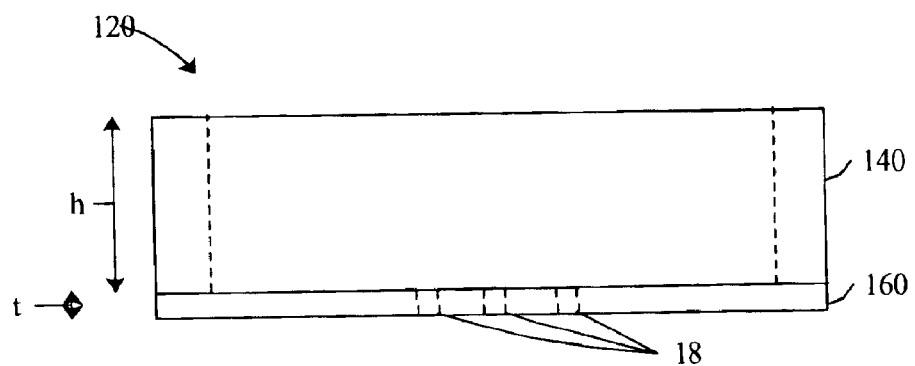
FIG. 9 is a side cross-section view of the planter 140 as in FIG. 8.
Figure 10:
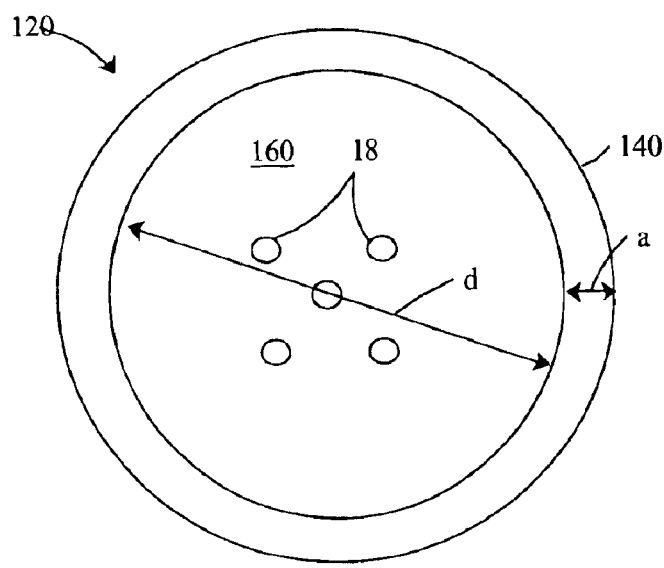
FIG. 10 is a top view of the planter 140 as in FIGS. 8 & 9.

FIG. 8 is a side perspective photo of an alternative embodiment of a planning system, inclusive of integrally-molded foam planter 120 and fill mix 7, 8 (again, a blend of calcined montmorillonite clay substrate and potting soil as above). FIG. 9 is a side cross-section view, and FIG. 10 is a top view, respectively, of the planter 120 as in FIG. 8. The entire planter 120 is constructed of closed-cell polyethylene foam of approximately 1.7 lb/cubic foot density. The planter 120 is formed in at least a two-piece construction, with an open-ended circular collar section 140 (identical to float ring 4 above). The open-ended circular collar section is heat sealed to a conforming circular base section 160, forming the planter 120 as shown in FIGS. 8–10. This configuration avoids the need for specialty molds. The base section 160 includes a plurality number of 0.25" diameter holes 18 that provide for the inflow of water and the self-watering is effect. The polyethylene foam is preferably black to resist ultra-violet (UV) damage from sunlight. Given this construction, if string algae is present in the pond, the contents of the planting system 120 are completely isolated from its invasion. As above, the floating planting system 120 has a much greater tendency to keep a neat, clean appearance free of both forms of algae. This embodiment can be used when suitable nursery containers or liners are not available to complete the planter system.

Figure 11:
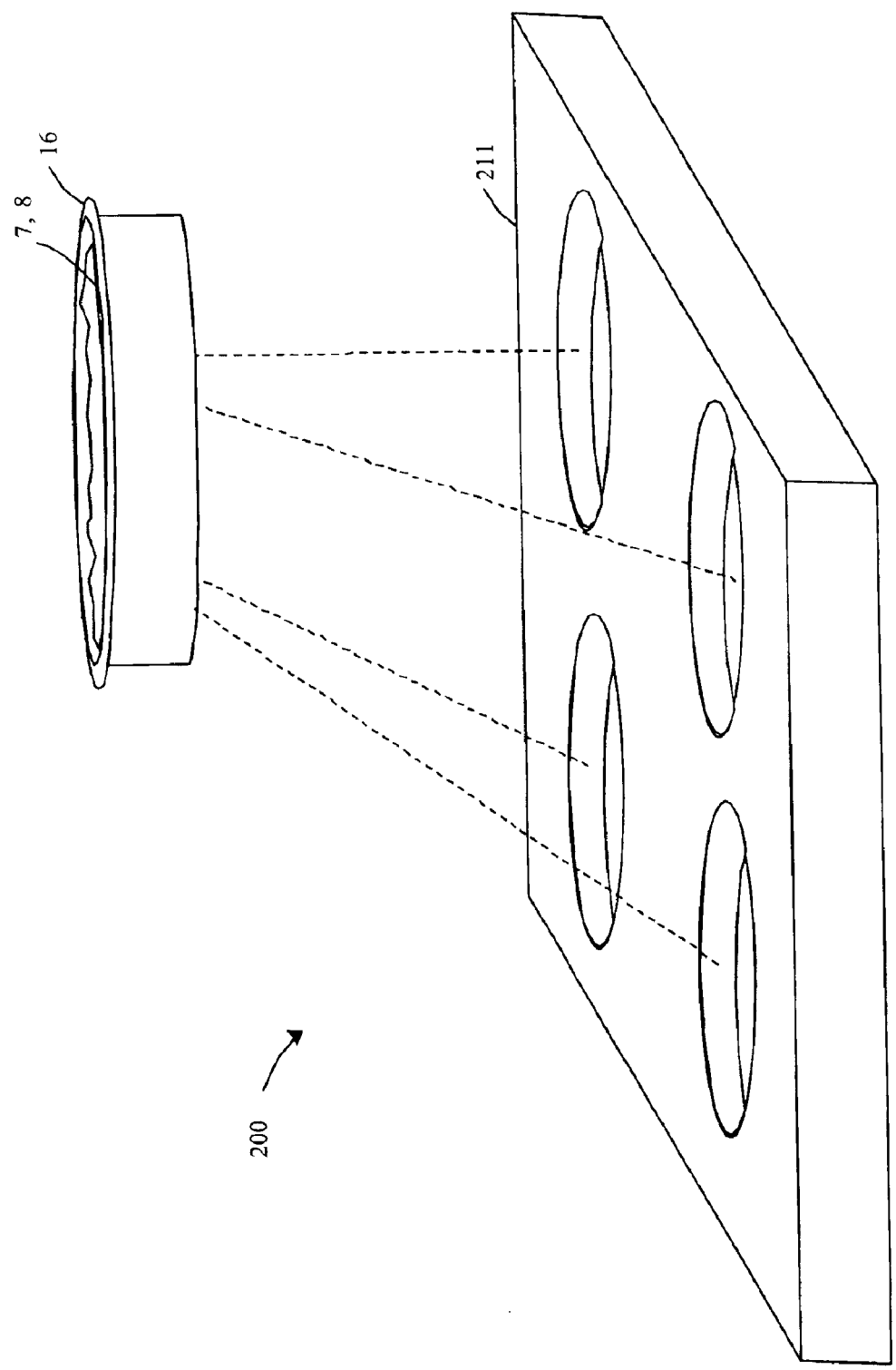
FIG. 11 is a side perspective of yet another embodiment of a floating raft system 200.

FIG. 11 is a side perspective of yet another embodiment, a floating raft system 200, inclusive of a polyethylene foam raft 211 containing numerous nested nursery planters 16 filled with plants 12. As above, the entire foam raft 211 is constructed of closed-cell polyethylene foam of approximately 1.7 lb/cubic foot density. Raft 211 is formed in a sheet with uniformly-spaced apertures each having a diameter d. The bowl of each of the planters 16 is sized to nest inside a corresponding aperture of raft 211, and is slidably inserted into raft 211 until the collars of planters 16 abut the raft 211 (as shown). Then the planters 16 are individually and partially filled to a predetermined depth (as previously described) with fill mix 7, 8. Such polyethylene foam raft systems can be used for retailing displays in stores or to create complex floating gardens of various shapes in ponds.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept.

It is to be understood, therefore, that the invention may be practiced otherwise than as specifically set forth in the appended claims.

What is claimed is:

1. A floating island planting system, comprising:
   a float ring formed as a circular walled member of closed-cell polyethylene foam having a first diameter;
   a garden planter formed in a bowl configuration with a collar of greater diameter than said first diameter, the bowl of said garden planter being dimensioned for nesting in said float ring, and said garden planter being defined by a plurality of holes through the closed bottom; and
   a fill mix residing in said garden planter, said fill mix comprising alternating layers of calcined montmorillonite clay and potting soil.

2. The floating island planting system according to claim 1, wherein said float ring is formed from a strip of closed-cell polyethylene foam that is heat sealed end-to-end.

3. The floating island planting system according to claim 2, wherein said garden planter is defined by a plurality of 0.25" diameter holes to provide for the inflow of water.

4. The floating island planting system according to claim 3, further comprising a mesh covering all of said plurality of holes.

5. The floating island planting system according to claim 3, wherein said fill mix further comprises a layer of potting soil overlying a layer of clay.

6. The floating island planting system according to claim 5, wherein said fill mix further comprises two layers of potting soil sandwiching a layer of clay.

7. The floating island planting system according to claim 1, wherein said garden planter is black to resist ultra-violet (UV) damage from sunlight.

8. The floating island planting system according to claim 7, wherein said float ring is black to resist ultra-violet (UV) damage from sunlight.

* * * * *